US012688113B2

(12) United States Patent
Yuan

(10) Patent No.: US 12,688,113 B2
(45) Date of Patent: Jul. 21, 2026

(54) TEXT SEARCH PROCESSING METHOD AND RELATED DEVICE

(71) Applicant: HUAWEI TECHNOLOGIES CO., LTD., Shenzhen (CN)

(72) Inventor: Suliang Yuan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 18/443,398

(22) Filed: Feb. 16, 2024

(65) Prior Publication Data

US 2024/0184687 A1 Jun. 6, 2024

Related U.S. Application Data

(63) Continuation of application No. PCT/CN2021/113863, filed on Aug. 20, 2021.

(51) Int. Cl.
*G06F 11/362* (2025.01)
*G06F 11/34* (2006.01)

(52) U.S. Cl.
CPC ...... *G06F 11/3636* (2013.01); *G06F 11/3476* (2013.01)

(58) Field of Classification Search
CPC .......................... G06F 11/3476; G06F 11/3636
USPC .................................................. 717/127–128
See application file for complete search history.

(56) References Cited

U.S. PATENT DOCUMENTS

| | | | | |
|---|---|---|---|---|
| 8,195,655 B2 * | 6/2012 | Agrawal | ............... | G06F 40/295 |
| | | | | 707/730 |
| 8,856,096 B2 * | 10/2014 | Marchisio | ............... | G06F 16/36 |
| | | | | 707/765 |
| 9,058,317 B1 * | 6/2015 | Gardner | ................ | G06F 40/268 |
| 9,396,287 B1 * | 7/2016 | Bhave | ................... | G06F 16/334 |
| 9,811,568 B2 * | 11/2017 | Lazaridis | .................. | G06F 3/14 |
| 2018/0011857 A1 * | 1/2018 | Xie | ...................... | G06F 16/9535 |

FOREIGN PATENT DOCUMENTS

| | | |
|---|---|---|
| KR | 20130014841 A | 2/2013 |
| WO | 2018182060 A1 | 10/2018 |

OTHER PUBLICATIONS

Microsoft Corporation, "Mcrosoft Computer Dictionary", 2002, Microsoft Press, pp. 301. (Year: 2002).*

(Continued)

*Primary Examiner* — Ted T. Vo

(57) ABSTRACT

A text search processing method and a related device are disclosed, to search a plurality of pieces of running path information for a keyword based on a keyword rule in a keyword rule set. The method includes: obtaining a first text, where the first text includes one or more pieces of running path information; obtaining a search rule set, where each search rule indicates a logical relationship between at least one keyword; searching for one or more second keywords based on a first keyword and a first search rule, where the first keyword is obtained based on first running path information, and the first running path information is any one of the one or more pieces of running path information; and determining a first search result based on the first keyword and the one or more second keywords.

18 Claims, 6 Drawing Sheets

(56)     References Cited

OTHER PUBLICATIONS

Koch et al., "Iterative Integration of Visual Insights during Scalable Patent Search and Analysis", 2011, IEEE, pp. 557-569. (Year: 2011).*

IFNEC, "Text Search Help" 2020, retrieved from https://www.ifnec. org/ifnec/work/textSearchHelp.jsp , 4 pages. (Year: 2020).*

Microsoft Support, "Offset Function", 2020, retrieved from https// support.microsoft.com , 4 pages. (Year: 2020).*

Extended European Search Report issued in EP21953817.0, dated Jul. 23, 2024, 8 pages.

Baidu Encyclopedia, Regular expression, [online], https://baike. baidu.com/item/%E6%AD%A3%E5%88%99%E8%A1%A8%E8% BE%BE%E5%BC%8F, Last updated on Sep. 9, 2024, total 37 pages.

* cited by examiner

| line01 | string... KW01 string... | Running process 1 |
|--------|--------------------------|-------------------|
| line02 | string... | |
| line03 | string... KW02 string... | |
| line04 | string... | |
| line05 | string... KW01 string... | Running process 2 |
| line06 | string... | |
| line07 | string... KW02 string... | |
| line08 | string... | |
| line09 | string... KW01 string... | |
| line10 | string... | |

FIG. 1

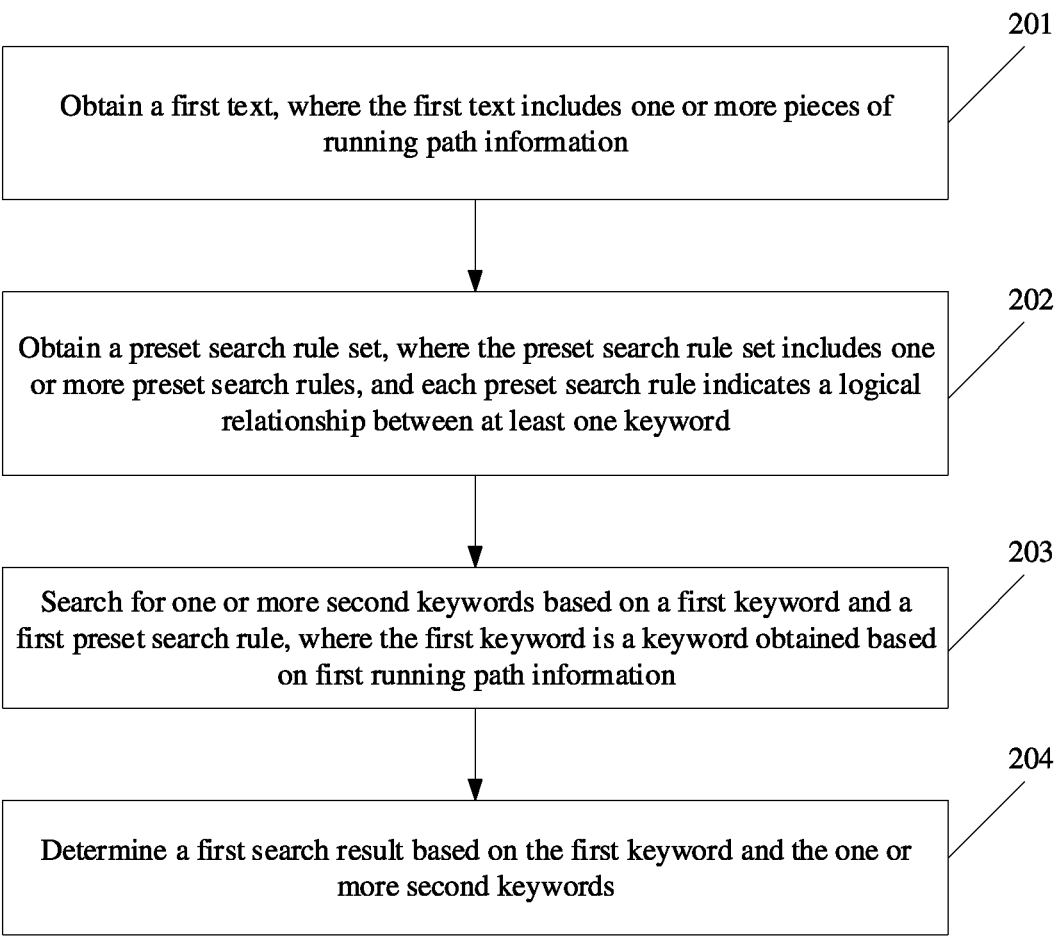

201

Obtain a first text, where the first text includes one or more pieces of running path information

202

Obtain a preset search rule set, where the preset search rule set includes one or more preset search rules, and each preset search rule indicates a logical relationship between at least one keyword

203

Search for one or more second keywords based on a first keyword and a first preset search rule, where the first keyword is a keyword obtained based on first running path information

204

Determine a first search result based on the first keyword and the one or more second keywords

FIG. 2

| Keyword sequence number | Keyword type | Keyword | Operator | Keyword value | Logical relationship | Preset row offset range |
|---|---|---|---|---|---|---|
| 0 | String ∨ | KW1 ∨ | Select ∨ | Vehicle ∨ | AND ∨ | 0 ∨ |
| 1 | String ∨ | KW2a ∨ | Select ∨ | Power supply ∨ | OR ∨ | 2 ∨ |
| 2 | String ∨ | KW2b ∨ | Select ∨ | Remaining electric quantity ∨ | OR ∨ | 2 ∨ |
| 3 | K-V ∨ | KW3 ∨ | Select ∨ | Management ∨ | NOT ∨ | 5 ∨ |
| 4 | String ∨ | KW4 ∨ | Select ∨ | Consumption ∨ | AND ∨ | 7 ∨ |

FIG. 3B

TEXT SEARCH PROCESSING METHOD AND RELATED DEVICE

CROSS-REFERENCE TO RELATED APPLICATIONS

This application is a continuation of International Application No. PCT/CN2021/113863, filed on Aug. 20, 2021, the disclosure of which is hereby incorporated by reference in its entirety.

TECHNICAL FIELD

This application relates to the field of information and communications technologies (ICT), and specifically, to a text search processing method and a related device.

BACKGROUND

Software code usually includes a large quantity of running branch structures. During actual running of the software code, corresponding running path information is recorded in a log file when different branches are run. During scanning and analysis of the log file, a running path of the software code is usually identified based on a keyword in the running path information to obtain an actual running behavior of the software code through analysis, to implement a corresponding quality policy.

However, in a related solution, a log file is usually searched for a keyword based on a regular expression to obtain a search result. However, log files generated in a period of time in which the software code is run are in a same file. If a plurality of pieces of running path information are searched for a keyword based on a regular expression, it is quite likely that search is performed through jumping from running path information in a current process to running path information in another process. As a result, a search result is inaccurate, and a search requirement of a user cannot be met.

SUMMARY

Embodiments of this application provide a text search processing method and a related device, to search a plurality of pieces of running path information for a keyword based on a keyword rule in a keyword rule set, so that a search result is relatively accurate, and a search requirement of a user is met.

A first aspect of embodiments of this application provides a text search processing method. The method may be applied to a log analysis and processing scenario. In addition, the method may also be applied to a device such as a terminal device or a vehicle. The method may include: obtaining a first text and a preset search rule set, where the first text includes one or more pieces of running path information, the preset search rule set includes one or more preset search rules, and each preset search rule indicates a logical relationship between at least one keyword; searching for one or more second keywords based on a first keyword and a first preset search rule, where the described first keyword is obtained based on first running path information, the first running path information is any one of the one or more pieces of running path information, and the first preset search rule is any preset search rule that is in the one or more preset search rules and that corresponds to the first running path information; and determining a first search result based on the first keyword and the one or more second keywords, where the first search result indicates a running behavior of a running path corresponding to the first running path information. According to the foregoing manner, in a multipath search scenario, a plurality of pieces of running path information are searched for a keyword based on a preset search rule in the preset search rule set, and a user does not need to master a complex regular expression, but only needs to understand a logical relationship between a plurality of keywords that need to be searched for. In addition, the first text with a relatively large data amount is divided into a plurality of to-be-processed subtexts each starting with a first keyword in each piece of running path information, and each piece of running path information corresponds to one or more preset search rules. In this way, remaining keywords can be searched for efficiently, quickly, and accurately.

In some possible implementations, a manner of searching for the one or more second keywords based on the first keyword and the first preset search rule may be specifically first obtaining a first row number, where the first row number is used to identify a number of a row in which the first keyword is located; and then searching a preset offset range for the one or more second keywords based on the first row number and the first preset search rule. It should be noted that the preset offset range indicates a row offset value between the one or more second keywords and the first keyword. A search range in which the second keyword is located may be quickly determined by using the preset offset range. In this way, only the preset offset range needs to be searched for the second keyword that meets the preset search rule, and there is no need to perform global search, thereby improving search efficiency.

In some possible implementations, the searching a preset offset range for the one or more second keywords based on the first row number and the first preset search rule includes: searching a first preset offset range for a third keyword based on the first row number and the first preset search rule, where the third keyword is any one of the one or more second keywords, and the first preset offset range corresponds to the third keyword. According to the foregoing manner, any one of the one or more second keywords, that is, the third keyword, may be searched for in the first preset offset range corresponding to the any keyword, thereby improving search efficiency.

In some possible implementations, the logical relationship includes at least one of the following: a first identifier, a second identifier, and a third identifier. The first identifier indicates that one or more keywords exist within the preset offset range, the second identifier indicates that one of the plurality of keywords exists in the preset offset range, and the third identifier indicates that one or more keywords do not exist in the preset offset range.

In some possible implementations, the one or more second keywords further include a fourth keyword and a fifth keyword. The method further includes: searching for the fourth keyword based on a second preset offset range, where the second preset offset range is obtained by using a row offset value between the fourth keyword and the first keyword, and the fourth keyword is one or more second keywords; or the second preset offset range is obtained by using a row offset value between the fifth keyword and the fourth keyword and a row offset value between the fourth keyword and the first keyword, and the fifth keyword is in the one or more second keywords and is different from the fourth keyword. According to the foregoing manner, a plurality of manners of determining the second preset offset range are provided, and are applicable to a plurality of possible scenarios.

In some possible implementations, the obtaining a first row number may include: obtaining a second text, where the second text is obtained by processing the first text by using a hash algorithm; and obtaining the first row number based on the second text. According to the foregoing manner, the first text is processed based on the hash algorithm, so that the first text can be converted into the second text in which data is stored by row. In this way, not only a number of a row in which a keyword in each piece of running path information is located can be quickly marked and recorded based on the second text, but also vertical search can be quickly performed.

In some possible implementations, a keyword type includes a string type and/or a key-value pair type.

In some possible implementations, not only the first running path information is searched for the one or more second keywords based on the first keyword and the first preset search rule to detect, by using the obtained first search result, the running behavior of the running path corresponding to the first running path information, but also the same operation processing may be performed on the remaining running path information based on another preset search rule in the preset search rule set. To be specific, the text search processing method further includes: searching second running path information for one or more seventh keywords based on a sixth keyword and a second preset search rule, where the sixth keyword is obtained based on the second running path information, and the second preset search rule is any preset search rule that is in the one or more preset search rules and corresponds to the second running path information; and determining a second search result based on the sixth keyword and the one or more seventh keywords, where the second search result indicates a running behavior of a running path corresponding to the second running path information.

It should be noted that the second running path information is different from the first running path information. In addition, the second preset search rule may be the same as or different from the first preset search rule. This is not limited in this application. In addition, the sixth keyword may be the same as or different from the first keyword. This is not limited in this application either.

According to a second aspect, an embodiment of this application provides a text search apparatus. The text search apparatus may be a terminal device, a vehicle, an intelligent vehicle, a computer, or the like. The text search apparatus includes an obtaining unit and a processing unit. The obtaining unit is configured to obtain a first text and a preset search rule set. The first text includes one or more pieces of running path information, the preset search rule set includes one or more preset search rules, and each preset search rule indicates a logical relationship between a plurality of keywords included in corresponding running path information. The processing unit is configured to: search for one or more second keywords based on a first keyword and a first preset search rule, and determine a first search result based on the first keyword and the one or more second keywords. It should be noted that the first keyword is obtained based on first running path information, the first running path information is any one of the one or more pieces of running path information, the first preset search rule is any preset search rule that is in the one or more preset search rules and corresponds to the first running path information, and the first search result indicates a running behavior of a running path corresponding to the first running path information.

In some possible implementations, the obtaining unit is configured to obtain a first row number, where the first row number is used to identify a number of a row in which the first keyword is located. The processing unit is configured to search a preset offset range for the one or more second keywords based on the first row number and the first preset search rule, where the preset offset range indicates a row offset value between the one or more second keywords and the first keyword.

In some possible implementations, the processing unit is further configured to search a first preset offset range for a third keyword based on the first row number and the first preset search rule, where the third keyword is any one of the one or more second keywords, and the first preset offset range corresponds to the third keyword.

In some possible implementations, the logical relationship includes at least one of the following: a first identifier, a second identifier, and a third identifier. The first identifier indicates that one or more keywords exist in the preset offset range, the second identifier indicates that one of the plurality of keywords exists in the preset offset range, and the third identifier indicates that one or more keywords do not exist in the preset offset range.

In some possible implementations, the one or more second keywords further include a fourth keyword and a fifth keyword. The processing unit is configured to search for the fourth keyword based on a second preset offset range, where the second preset offset range is obtained by using a row offset value between the fourth keyword and the first keyword, and the fourth keyword is one or more second keywords; or the second preset offset range is obtained by using a row offset value between the fifth keyword and the fourth keyword and a row offset value between the fourth keyword and the first keyword, and the fifth keyword is in the one or more second keywords and is different from the fourth keyword.

In some possible implementations, the obtaining unit is configured to: obtain a second text, where the second text is obtained by processing the first text by using a hash algorithm; and obtain the first row number based on the second text.

In some possible implementations, a keyword type includes a string type and/or a key-value pair type.

In some other possible implementations, the processing unit is further configured to search second running path information for one or more seventh keywords based on a sixth keyword and a second preset search rule, where the sixth keyword is obtained based on the second running path information, and the second preset search rule is any preset search rule that is in the one or more preset search rules and corresponds to the second running path information. Then, the processing unit further determines a second search result based on the sixth keyword and the one or more seventh keywords, where the second search result indicates a running behavior of a running path corresponding to the second running path information.

A third aspect of this application provides a vehicle, where the vehicle may include a memory, configured to store computer-readable instructions. The vehicle may further include a processor coupled to the memory. The processor is configured to execute the computer-readable instructions in the memory to perform the method described in any one of the first aspect or the possible implementations of the first aspect.

A fourth aspect of this application provides a server, where the server may include a memory, configured to store computer-readable instructions. The server may further include a processor coupled to the memory. The processor is configured to execute the computer-readable instructions in the memory to perform the method described in any one of the first aspect or the possible implementations of the first aspect.

A fifth aspect of this application provides a computer-readable storage medium. When instructions are run on a computer apparatus, the computer apparatus is enabled to perform the method described in any one of the first aspect or the possible implementations of the first aspect.

A sixth aspect of this application provides a computer program product. When the computer program product runs on a computer, the computer is enabled to perform the method described in any one of the first aspect or the possible implementations of the first aspect.

A seventh aspect of this application provides a chip system. The chip system may include a processor, configured to support a text search apparatus in implementing a function in the method described in any one of the first aspect or the possible implementations of the first aspect.

Optionally, with reference to the seventh aspect, in a first possible implementation, the chip system may further include a memory. The memory is configured to store program instructions and data that are necessary for the text search apparatus. The chip system may include a chip, or may include a chip and another discrete component. The chip system may include an application-specific integrated circuit (ASIC), a field programmable gate array (FPGA), another programmable logic device, or the like. Further, the chip system may further include an interface circuit and the like.

It should be noted that, for understanding of beneficial effects brought by the implementations of the second aspect to the sixth aspect of this application, refer to the implementations of the first aspect.

In the technical solutions provided in embodiments of this application, each piece of running path information corresponds to one or more preset search rules, and each preset search rule indicates a logical relationship between a plurality of keywords included in running path information. Therefore, after the first keyword is obtained from the first running path information, the one or more second keywords may be searched for based on the first keyword and the first preset search rule, to determine the first search result based on the first keyword and the one or more second keywords. In a multipath search scenario, a plurality of pieces of running path information are searched for a keyword based on a keyword rule in a keyword rule set, and a user does not need to master a complex regular expression, but only needs to understand a logical relationship between a plurality of keywords that need to be searched for. In addition, a to-be-processed log text with a relatively large data amount is divided into a plurality of to-be-processed subtexts each starting with a first keyword in each piece of running path information. In this way, remaining keywords can be searched for efficiently, quickly, and accurately.

BRIEF DESCRIPTION OF DRAWINGS

To describe the technical solutions in embodiments of this application more clearly, the following briefly describes the accompanying drawings required for describing the embodiments. It is clear that, the accompanying drawings in the following description show merely some embodiments of this application.

FIG. 1 is a schematic diagram of searching for a keyword in a related solution;

FIG. 2 is a schematic flowchart of an example text search processing method according to an embodiment of this application;

FIG. 3B is a schematic diagram of an example interface for establishing a search rule according to an embodiment of this application;

DESCRIPTION OF EMBODIMENTS

Figure 3A:
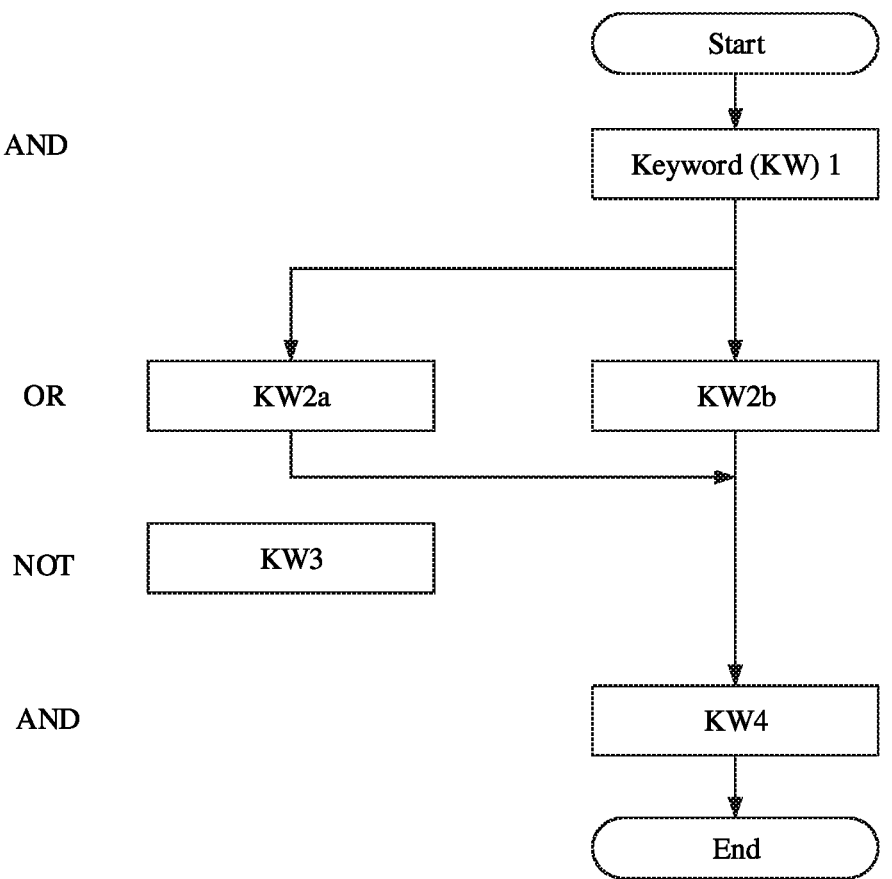
FIG. 3A is a schematic diagram of an example preset logical relationship between a plurality of keywords according to an embodiment of this application.

Embodiments of this application provide a text search processing method and a related device, to search a plurality of pieces of running path information for a keyword based on a keyword rule in a keyword rule set, so that a search result is relatively accurate, and a search requirement of a user is met.

The following describes the technical solutions in embodiments of this application with reference to the accompanying drawings in embodiments of this application. It should be understood that, the terms "include" and "comprise" used in this specification and claims of this application indicate the existence of the described feature, entity, step, operation, element and/or component, but do not exclude the existence or addition of one or more other features, entities, steps, operations, elements, components and/or a combination thereof. It should also be understood that, the terms used in this specification of this application are merely intended to describe specific embodiments, but are not intended to limit this application.

Software code usually includes a large quantity of running branch structures. During actual running of the software code, corresponding running path information is recorded in a log file when different branches are run. During scanning and analysis of the log file, a running path of the software code is usually identified based on a keyword (KW) in the running path information to obtain an actual running behavior of the software code through analysis, to implement a corresponding quality policy.

However, in a related solution, a log file is usually searched for a keyword based on a regular expression to obtain a search result. FIG. 1 is a schematic diagram of searching for a keyword in a related solution. It can be learned from FIG. 1 that log texts generated in two different running processes (for example, a running process 1 and a running process 2) of software code are in a same log file. In addition, if a user wants to search for, by using keywords KW01, KW02, and KW03, a log generated in the running process 2, but when the search is performed based on a conventional regular expression, it is quite likely that line01.KW01 and line03.KW02 generated in the running process 1 and line09.KW03 generated in the running process 2 are found. It is clear that, during search of a plurality of pieces of running path information for a keyword based on a regular expression, it is quite likely that search is performed through jumping from running path information in the current process 2 to running path information in another process 1. As a result, a search result is inaccurate, and a search requirement of the user cannot be met.

Therefore, to resolve the technical problem caused in the foregoing related solution, an embodiment of this application provides a text search processing method, to search a plurality of pieces of running path information for a keyword based on a keyword rule (KWR) in a keyword rule set (KWRS), so that a search result is relatively accurate, and a search requirement of a user is met. The text search processing method may be applied to a vehicle, or may be applied to a device such as a terminal device or a server. The vehicle may include but is not limited to an intelligent vehicle and the like. The terminal device may include but is not limited to a personal computer, a mobile phone, a tablet computer, a wearable intelligent device, and the like. The text search processing method may be applied to a log analysis and processing scenario. For example, the method is applicable to an analysis and processing scenario of a log including but not limited to a software log of a vehicle-mounted product and a log generated in a system running process, and may also be applicable to an analysis scenario of a log in another product form. This is not limited herein. In addition, the text search processing method may also be applied to an entire life cycle of a product, or may be applied to a development stage, a debugging stage, a maintenance stage, or the like. This is not limited herein.

FIG. 2 is a schematic flowchart of a an embodiment of text search processing method according to an embodiment of this application. The text search processing method shown in FIG. 2 may be applied to a text search apparatus. The text search apparatus may include but is not limited to a vehicle, a terminal device, a server, and the like. This is not limited herein. As shown in FIG. 2, the text search processing method includes the following steps.

201: Obtain a first text, where the first text includes one or more pieces of running path information.

In this example, corresponding log texts are generated during running of software code in different processes. In addition, a log text includes one or more pieces of running path information, and each piece of running path information may include a plurality of keywords. Therefore, for each running process, a first text in the running process may be obtained.

In addition, the first text may be stored in a device such as a local server, or may be uploaded and stored on a cloud side. Therefore, the first text may be obtained from the device such as a local server, or the first text may be obtained from the cloud side. In actual application, there may also be another obtaining manner. This is not limited herein. In addition, the first text includes but is not limited to a log text of vehicle power management, a software log of a vehicle-mounted product, a log generated in a system running process, and the like. This is not limited herein.

It should be noted that a keyword type may include a string type and/or a key-value (K-V) pair type. The key-value pair type is a dictionary type with an operator, and a general format of the key-value pair type is key op value. For example, state=Init, date: 20201104. In actual application, the keyword type may alternatively be another type. This is not specifically limited herein.

202: Obtain a preset search rule set, where the preset search rule set includes one or more preset search rules, and each preset search rule indicates a logical relationship between at least one keyword.

In this example, because each piece of running path information may include a plurality of keywords, a logical relationship between at least one keyword in each piece of running path information is set as a preset search rule. In this way, one piece of running path information may be corresponding to one or more preset search rules, and the one or more preset search rules are combined into the preset search rule set.

For example, for running path information A, for understanding of a logical relationship between at least one keyword included in the running path information A, refer to FIG. 3A. As shown in FIG. 3A, the logical relationship may be as follows: KW1 needs to appear in the running path information A, and this may be identified by using a symbol "AND"; any keyword of KW2a and KW2b may appear in the running path information A, and this may be identified by using a symbol "OR"; KW3 does not need to appear in the running path information A, and this may be identified by using a symbol "NOT"; and KW4 is a keyword that needs to appear in the running path information A and that indicates that search performed in the running path information A ends, and this may be identified by using a symbol "AND". Based on this, the logical relationship shown in FIG. 3A may be configured as a preset search rule corresponding to the running path information A.

FIG. 3B is a schematic diagram of an example interface for establishing a search rule according to an embodiment of this application. It can be learned from FIG. 3B that, on the interactive display interface, an input window of the preset search rule includes a "keyword type" input window, a "keyword" input window, a "keyword value" input window, a "logical relationship" input window, a "preset offset range" input window, and the like. A user may fill, based on an actual requirement, the input windows corresponding to FIG. 3B with keywords that meet a logical relationship, to obtain a preset search rule.

For example, if the user needs to search a "log text of vehicle power management" for a keyword, and expects to find a keyword that meets the logical relationship shown in FIG. 3A. For example, KW1 is Vehicle, KW2a is Power supply, KW2b is Remaining power, KW3 is Management, and KW4 is Consumption.

In this case, the user may use KW1 of a string type as a search entrance for running path information A in the "log text of vehicle power management", and respectively fill the "keyword type" input window, the "keyword" input window, an "operator" input window, the "keyword value" input window, the "logical relationship" input window, and a "preset row offset range" input window with String, KW1, " ", Vehicle, AND, and 0.

Similarly, if the user expects to search a preset offset range with a maximum row offset of 2 for any one of KW2a and KW2b, the user may also add search windows for two keywords. The user respectively fills a "keyword type" input window, a "keyword" input window, an "operator" input window, a "keyword value" input window, a "logical relationship" input window, and a "preset row offset range" input window for one keyword with String, KW2a, " ", Power supply, OR, and 2. In addition, the user respectively fills a "keyword type" input window, a "keyword" input window, an "operator" input window, a "keyword value" input window, a "logical relationship" input window, and a "preset row offset range" input window for another keyword with String, KW2b, " ", Remaining electric quantity, OR, and 2.

Similarly, if the user expects to exclude a keyword "Management" in a preset offset range with a maximum row offset of 5. In this case, the user may also add a search window for a keyword, and respectively fills a "keyword type" input window, a "keyword" input window, an "operator" input window, a "keyword value" input window, a "logical relationship" input window, and a "preset row offset range" input window with K-V, KW3, " ", Management, NOT, and 5.

In addition, the user also expects to find a keyword "Consumption" in a preset offset range with a maximum row offset of 7. In this case, the user may also respectively fill a "keyword type" input window, a "keyword" input window, an "operator" input window, a "keyword value" input window, a "logical relationship" input window, and a "preset row offset range" input window with String, KW4, " ", Consumption, AND, and 7.

In this way, after the user fills the interactive display interface with a logical relationship between all keywords that need to be searched for, a preset search rule corresponding to the logical relationship may be generated. It should be noted that values in the input windows shown in FIG. 3B are merely examples for description. This is not limited in this application. For understanding of the described preset offset range, refer to the following content in step 203.

The preset search rule may be a segment of machine executable code, and includes but is not limited to a format such as xml, json, or yaml. For example, the preset search rule that is shown in FIG. 3B and corresponds to the running path information A may be expressed in an xml format, and is specifically as follows:

```
[
    {
        "type": "String",
        "KW": "KW1",
        "operator": "",
        "value": "Vehicle",
        "option": "",
        "offset": "0"
    },
    {
        "type": "String",
        "KW": "KW2a, KW2b",
        "operator": "",
        "value": "Power supply, Remaining electric quantity",
        "option": "OR",
        "offset": "2"
    },
    {
        "type": "String",
        "KW": "KW3",
        "operator": "",
        "value": "Management",
        "option": "NOT",
        "offset": "5"
    },
    {
        "type": "String",
        "KW": "KW4",
        "operator": "",
        "value": "Consumption",
        "option": "AND",
        "offset": "7"
    }
]
```

It should be noted that the foregoing uses only the logical relationship shown in FIG. 3A as an example to describe a preset search rule corresponding to the running path information A in the log text of vehicle power management. In actual application, the preset search rule corresponding to the running path information A may be alternatively set based on another logical relationship. In addition, for a plurality of pieces of running path information, for understanding of one or more preset search rules corresponding to each piece of running path information, also refer to the logical relationship shown in FIG. 3A.

203: Search for one or more second keywords based on a first keyword and a first preset search rule, where the first keyword is obtained based on first running path information.

In this example, one or more corresponding preset search rules are configured for each piece of running path information. In addition, during search of each piece of running path information for a keyword, a preset to-be-searched-for keyword needs to be first set as a search entrance of the current running path information. Therefore, the first keyword may be obtained based on the first running path information, or a preset to-be-searched-for keyword in the first running path information is determined as the first keyword. Then, after the first keyword is obtained, the first running path information may be searched for the one or more second keywords based on the first keyword and the first preset search rule.

For example, it is assumed that the first preset search rule is the search rule shown in FIG. 3A and FIG. 3B and that the first running path information is the running path information A in the log text of the vehicle power management. In this case, the user may use KW1 in the preset search rule as a search entrance of the running path information A, that is, the first keyword. In this way, based on KW1 and the preset search rule shown in FIG. 3A and FIG. 3B, the running path information A can be searched for another keyword that meets the preset search rule, that is, one or more second keywords, for example, KW2a or KW2b, and KW4.

In some possible examples, to quickly search for another keyword, a maximum row offset may be set for each keyword. For example, step 203 of searching for one or more second keywords may be specifically performed in the following manner: obtaining a first row number, where the first row number is used to identify a number of a row in which the first keyword is located; and searching a preset offset range for the one or more second keywords based on the first row number and the first preset search rule.

It should be noted that the preset offset range indicates a row offset value between the one or more second keywords and the first keyword. Alternatively, it may be understood that a row offset range is set for each second keyword. To be specific, a row offset value between a current second keyword and the first keyword is represented by using a row offset range. In this way, only a specific row offset range needs to be searched for another keyword, and there is no need to perform full-text search, thereby improving search efficiency. The described row offset range is an estimated quantity, and is not limited herein.

For example, the searching a preset offset range for the one or more second keywords based on the first row number and the first preset search rule may alternatively be performed in the following manner: searching a first preset offset range for a third keyword based on the first row number and the first preset search rule, where the third keyword is any one of the one or more second keywords, and the first preset offset range corresponds to the third keyword.

For example, the preset search rule shown in FIG. 3B is used as an example. KW1 is used as a first keyword, and a row offset range corresponding to KW1 is 0. KW2a is used as a second keyword that needs to be searched for, and a maximum row offset range from KW2a to a row in which KW1 is located may be set to 2. In this case, KW2a only needs to be searched for in two rows following KW1. Similarly, KW2b, KW3, and KW4 are used as other second keywords that need to be searched for, and maximum row offset ranges from KW2b, KW3, and KW4 to the row in which KW1 is located may be respectively set to 2, 5, and 7. It should be noted that the row offset range of 2 is merely used as an example herein to describe row offset ranges between KW2a and KW1 and between KW2b and KW1. In actual application, the row offset range may alternatively be set to another row offset range, for example, 4 or 8. This is not limited herein. In addition, row offset ranges corresponding to KW3 and KW4 may alternatively be set to another value. This is not limited herein. In addition, if a row offset range corresponding to KW2a is set to 0, it indicates that KW2a and KW1 are located in a same row in the running path information A. For understanding of other keywords such as KW3 and KW4, also refer to the description about KW2a.

When a row offset range is set for each second keyword, a logical relationship may be alternatively set to whether each keyword needs to appear in a corresponding row offset range. Specifically, the logical relationship may include at least one of the following: a first identifier, a second identifier, and a third identifier. The first identifier indicates that one or more keywords exist in the preset offset range, the second identifier indicates that one of the plurality of keywords exists in the preset offset range, and the third identifier indicates that one or more keywords do not exist in the preset offset range.

It should be noted that the first identifier may be understood as "AND" in FIG. 3A, the second identifier may be understood as "OR" in FIG. 3A, and the third identifier may also be understood as "NOT" in FIG. 3A. In actual application, the first identifier, the second identifier, and the third identifier may be alternatively represented by using other identifiers. This is not limited herein.

In addition, in some examples, a preset offset range may be directly set for each second keyword. To be specific, the one or more second keywords further include a fourth keyword and a fifth keyword. In this case, the preset offset range may be determined for each second keyword in the following two manners.

(1) The fourth keyword is searched for based on a second preset offset range. The second preset offset range is obtained by using a row offset value between the fourth keyword and the first keyword, and the fourth keyword is one or more second keywords. In other words, a second preset offset range may be directly set for each fourth keyword. The second preset offset range in this case is a row offset value between each fourth keyword and the first keyword. For example, if a fourth keyword that needs to be searched for currently is KW2a, a row offset value between KW2a and KW1 may be set to 6, 7, 8, or the like. The range of the second preset offset range in this case may be 6 to 8. In other words, in this case, KW2a only needs to be searched for in eight rows following the row in which KW1 is located.

(2) Alternatively, the fourth keyword is searched for based on a second preset offset range. The second preset offset range in this case is obtained by using a row offset value between the fifth keyword and the fourth keyword and a row offset value between the fourth keyword and the first keyword, and the fifth keyword is in the one or more second keywords and is different from the fourth keyword.

For example, if a fifth keyword that needs to be searched for currently is KW4, and it is known that the row offset value between the fourth keyword KW2a and KW1 is 6, 7, 8, or the like (that is, the row offset range of KW2a is 6 to 8), if a row offset range needs to be set for KW4, a row offset value (for example, 1 and 2) between KW4 and KW2a may be set based on the row offset range (for example, 6 to 8) of KW2a. In this way, based on the row offset range (that is, 6 to 8) set for the fourth keyword KW2a and the row offset value (that is, 1 and 2) between KW4 and KW2a, a second preset offset range between KW4 and KW1, that is, 7 to 10, may be learned.

Any one piece of running path information (that is, the first running path information) in the one or more pieces of running path information is used as an example for description. A first file is processed by using a hash algorithm to obtain a second text, and then a first row number is obtained based on the second text; and a first keyword in a row marked and recorded based on the first row number is used as a search entrance. Then, the preset offset range is searched based on a preset search rule corresponding to the first running path information, so that one or more second keywords that meet the preset search rule can be found. It should be noted that the described hash algorithm includes but is not limited to an MD5 message-digest algorithm (MD5), an MD4 algorithm, and the like. This is not limited herein.

Figure 4:
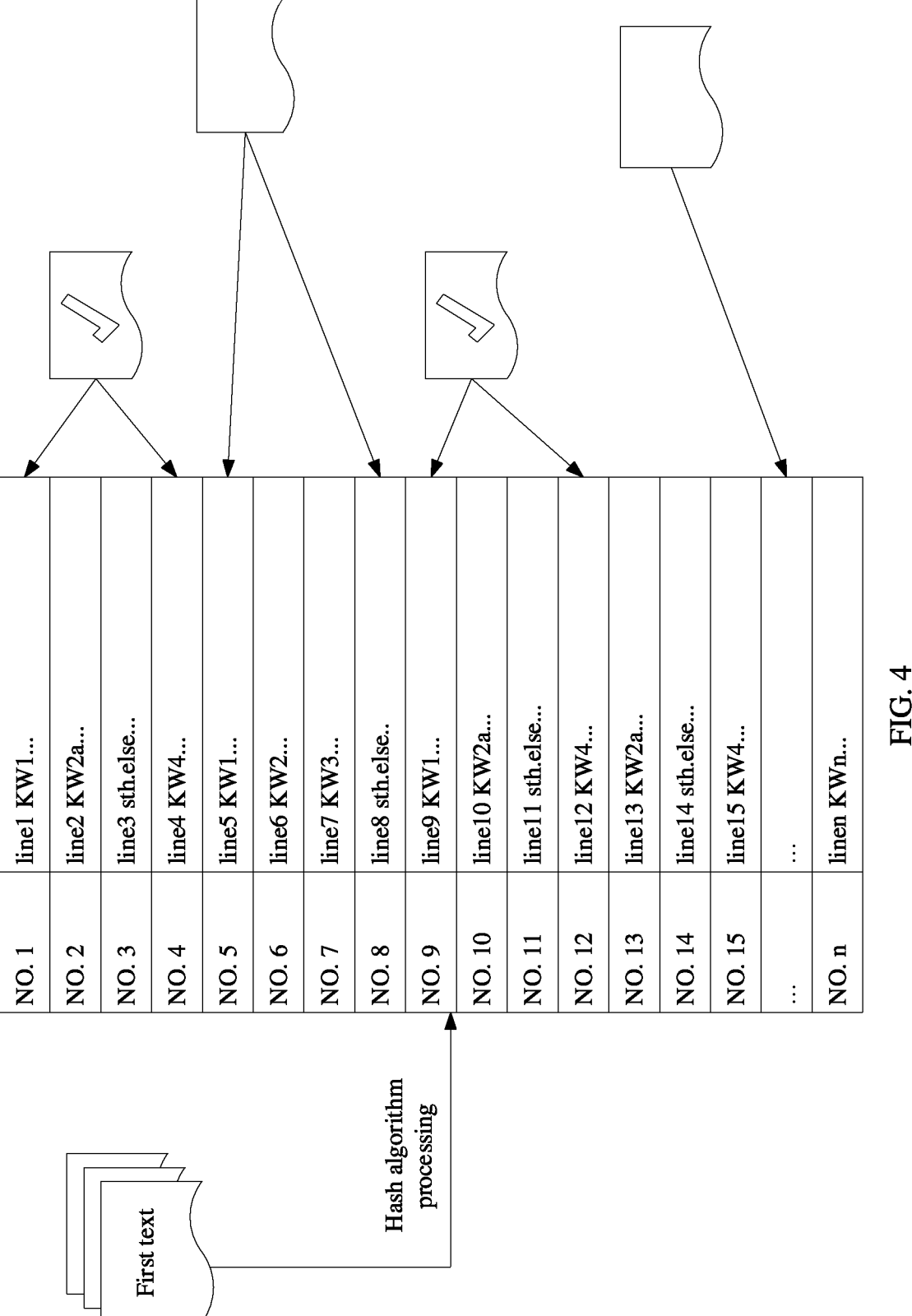
FIG. 4 is a schematic diagram of search performed by using an example solution in an embodiment of this application.

For example, FIG. 4 is a schematic diagram of search performed by using an example solution in an embodiment of this application. It can be learned from FIG. 4 that the first text may be converted into the second text after being processed by using the hash algorithm. It should be noted that the second text may be understood as a matrix text structure stored by row. A row in which the first keyword (for example, KW1) is located may be quickly marked and recorded from the second text, for example, No. 1, No. 5, and No. 9. Then, first keywords in rows corresponding to No. 1, No. 5, and No. 9 are used as search entrances, and search and matching are performed based on segments to search for a second keyword until all segments are searched. It is clear that, it can be learned from FIG. 4 that second keywords found in a segment 1 and a segment 3 meet the preset search rule.

It should be noted that for understanding of searching a plurality of pieces of running path information for one or more keywords, also refer to searching the first running path information for one or more keywords.

204: Determine a first search result based on the first keyword and the one or more second keywords.

In this example, after the one or more second keywords are found, the first search result, for example, a corresponding running scenario when the first running path information is recorded during running, or exception information generated when the first running path information is recorded during running, may be determined based on the first keyword. The first search result may reflect a running behavior of a running path corresponding to the one or more pieces of running path information. For example, based on the first search result, a specific running path on which an error or an alarm occurs, or the like may be learned. In this way, a system running status and the like may be further analyzed based on error information or alarm information corresponding to the running path on which an error or an alarm occurs.

It should be noted that the first search result changes with the first preset search rule. For example, for one piece of running path information A, the running path information A corresponds to two first preset search rules (that is, a search rule A and a search rule B). If the search rule A is different from the search rule B, the remaining second keyword found from the running path information A based on the search rule A is also different from a second keyword found from the running path information A based on the search rule B. Therefore, first search results determined based on the search rule A and the search rule B are also different.

The foregoing mainly describes how to search for one or more keywords from a perspective of any one piece of running path information (that is, the first running path information) in the one or more pieces of running path information. When the first text includes a plurality of pieces of running path information, the user expects to search each of the plurality of pieces of running path information for a corresponding keyword, to analyze the entire first text. Therefore, in some other possible implementations, the text search processing method may further include: searching second running path information for one or more seventh keywords based on a sixth keyword and a second preset search rule; and determining a second search result based on the sixth keyword and the one or more seventh keywords, where the second search result indicates a running behavior of a running path corresponding to the second running path information.

It should be noted that the sixth keyword is a preset to-be-searched-for keyword in the second running path information. For understanding of the sixth keyword, refer to the first keyword in the first running path information. In addition, the sixth keyword may be the same as or different from the first keyword. This is not limited herein. In addition, the second running path information may also be understood as any one of one or more pieces of running path information. However, it should be noted that the second running path information is different from the first running path information. In addition, the second preset search rule is any preset search rule that is in the one or more preset search rules and corresponds to the second running path information. For understanding of the described second preset search rule, also refer to the foregoing first preset search rule.

In this embodiment of this application, each piece of running path information corresponds to one or more preset search rules, and each preset search rule indicates a logical relationship between at least one keyword. Therefore, after the first keyword is obtained based on the first running path information, the one or more second keywords may be searched for based on the first keyword and the first preset search rule, to determine the first search result based on the first keyword and the one or more second keywords. In a multipath search scenario, a plurality of pieces of running path information are searched for a keyword based on a keyword rule in a keyword rule set, and a user does not need to master a complex regular expression, but only needs to understand a logical relationship between a plurality of keywords that need to be searched for. In addition, the first text with a relatively large data amount is divided into a plurality of to-be-processed subtexts each starting with a first keyword in each piece of running path information, and each piece of running path information corresponds to one or more preset search rules. In this way, remaining keywords can be searched for efficiently, quickly, and accurately.

The foregoing mainly describes the solutions provided in embodiments of this application from a perspective of the method. It may be understood that, to implement the foregoing functions, the foregoing text search apparatus includes corresponding hardware structures and/or software modules for performing the functions. A person skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of an entity device, the foregoing text search apparatus may be specifically implemented by one entity device, or may be jointly implemented by a plurality of entity devices, or may be a logical functional unit in an entity device. This is not specifically limited in embodiments of this application.

Figure 5:
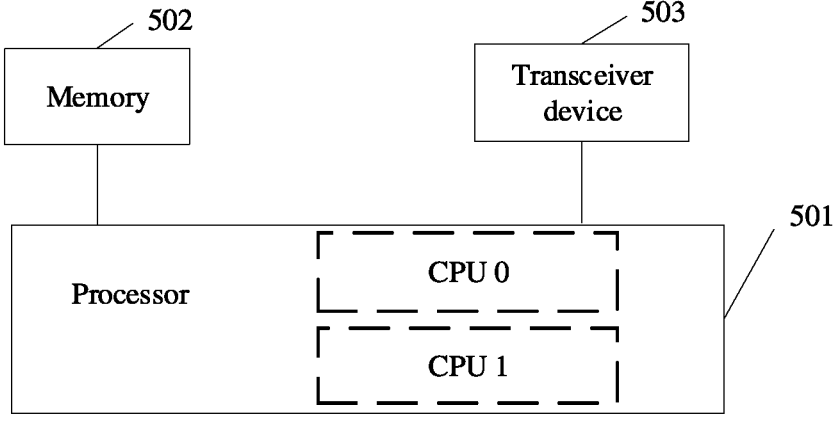
FIG. 5 is a schematic diagram of a hardware structure of an example communications device according to an embodiment of this application.

For example, the foregoing text search apparatus may be implemented by an example communications device in FIG. 5. FIG. 5 is a schematic diagram of a hardware structure of the communications device according to an embodiment of this application. The communications device includes at least one processor 501, a memory 502, and a transceiver device 503.

The processor 501 may be a general-purpose central processing unit CPU, a microprocessor, an application-specific integrated circuit, or one or more integrated circuits configured to control program execution of the solutions in this application. The processor 501 can perform operations such as determining, analysis, and operation, including searching for one or more second keywords based on a first keyword and a first preset search rule. In addition, the processor 501 further determines a first search result based on the first keyword and the one or more second keywords; and the like.

The transceiver device 503 uses any apparatus such as a transceiver, and is configured to communicate with another device or a communications network, for example, an Ethernet, a radio access network (RAN), or a wireless local area network (WLAN). The transceiver device 503 may be connected to the processor 501. The transceiver device 503 may obtain a first text, a preset search rule set, and the like.

The memory 502 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another magnetic storage device, or any other medium capable of carrying or storing desired program code in a form of an instruction or a data structure and capable of being accessed by a computer, but is not limited thereto. The memory 502 may exist independently, or may be connected to the processor 501. The memory 502 may be integrated with the processor 501.

The memory 502 is configured to store computer-executable instructions for executing the solutions in this application, and the processor 501 controls execution of the computer-executable instructions. The processor 501 is configured to execute the computer-executable instructions stored in the memory 502, to implement the text search processing method provided in the foregoing method embodiment of this application.

In a possible implementation, the computer-executable instructions in this embodiment of this application may also be referred to as application program code. This is not specifically limited in embodiments of this application.

During specific implementation, in an embodiment, the processor 501 may include one or more CPUs, for example, a CPU 0 and a CPU 1 in FIG. 5.

From a perspective of a functional unit, in this application, a text search apparatus may be divided into functional units based on the foregoing method embodiment. For example, the functional units may be obtained through division based on corresponding functions, or two or more functions may be integrated into one functional unit. The integrated functional unit may be implemented in a form of hardware, or may be implemented in a form of a software functional unit.

Figure 6:
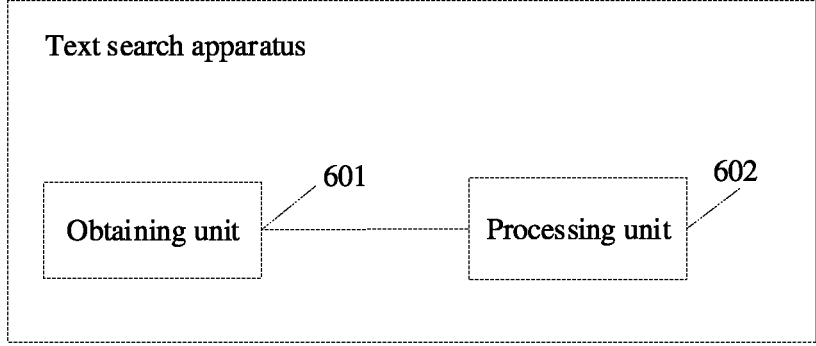
FIG. 6 is a schematic diagram of a structure of an example packet processing apparatus according to an embodiment of this application.

For example, when the functional units are obtained through division in an integrated manner, FIG. 6 is a schematic diagram of a structure of an example text search apparatus according to an embodiment of this application. As shown in FIG. 6, an embodiment of the text search apparatus in this application may include an obtaining unit 601 and a processing unit 602.

The obtaining unit 601 is configured to obtain a first text, where the first text includes one or more pieces of running path information. For a specific implementation, refer to the detailed description of step 201 in FIG. 2.

The obtaining unit 601 is further configured to obtain a preset search rule set, where the preset search rule set includes one or more preset search rules, and each preset search rule indicates a preset logical relationship between at least one keyword. For a specific implementation, refer to the detailed description of step 202 in FIG. 2.

The processing unit 602 is configured to search for one or more second keywords based on a first keyword and a first preset search rule. The first keyword is obtained based on first running path information, the first running path information is any one of the one or more pieces of running path information, and the first preset search rule is any preset search rule that is in the one or more preset search rules and corresponds to the first running path information. For a specific implementation, refer to the detailed description of step 203 in FIG. 2.

The processing unit 602 is further configured to determine a first search result based on the first keyword and the one or more second keywords. For a specific implementation, refer to the detailed description of step 204 in FIG. 2.

In some optional embodiments, the processing unit 602 is configured to: obtain a first row number, and search a preset offset range for the one or more second keywords based on the first row number and the first preset search rule. The first row number is used to identify a number of a row in which the first keyword is located, and the preset offset range indicates a row offset value between the one or more second keywords and the first keyword. For a specific implementation, refer to the detailed description of step 203 in FIG. 2.

In some other optional embodiments, the processing unit 602 is further configured to search a first preset offset range for a third keyword based on the first row number and the first preset search rule, where the third keyword is any one of the one or more second keywords, and the first preset offset range corresponds to the third keyword. For a specific implementation, refer to the detailed description of step 203 in FIG. 2.

In some other optional embodiments, the logical relationship includes a first identifier, a second identifier, and/or a third identifier, the first identifier indicates that one or more keywords exist in the preset offset range, the second identifier indicates that one of the plurality of keywords exists in the preset offset range, and the third identifier indicates that one or more keywords do not exist in the preset offset range.

In some other optional embodiments, the one or more second keywords further include a fourth keyword and a fifth keyword. The processing unit 602 is configured to search for the fourth keyword based on a second preset offset range, where the second preset offset range is obtained by using a row offset value between the fourth keyword and the first keyword, and the fourth keyword is one or more second keywords; or the second preset offset range is obtained by using a row offset value between the fifth keyword and the fourth keyword and a row offset value between the fourth keyword and the first keyword, and the fifth keyword is in the one or more second keywords and is different from the fourth keyword.

In some other optional embodiments, the obtaining unit 601 is configured to: obtain a second text, where the second text is obtained by processing the first text by using a hash algorithm; and obtain the first row number based on the second text.

In some other optional embodiments, a keyword type includes a string type and/or a key-value pair type.

In some other possible implementations, the processing unit 602 is further configured to search second running path information for one or more seventh keywords based on a sixth keyword and a second preset search rule, where the sixth keyword is obtained based on the second running path information, and the second preset search rule is any preset search rule that is in the one or more preset search rules and corresponds to the second running path information. Then, the processing unit 602 further determines a second search result based on the sixth keyword and the one or more seventh keywords, where the second search result indicates a running behavior of a running path corresponding to the second running path information.

The text search apparatus provided in this embodiment of this application is configured to perform the method in the method embodiment corresponding to FIG. 2. Therefore, for understanding of this embodiment of this application, refer to a related part in the method embodiment corresponding to FIG. 2. In addition, the text search apparatus may include but is not limited to a vehicle, a terminal device, a server, and the like.

In this embodiment of this application, the text search apparatus is presented in a form of functional units obtained through division in an integrated manner. The "functional unit" herein may be an application-specific integrated circuit (ASIC), a processor that executes one or more software or firmware programs and a memory, an integrated logic circuit, and/or another component that can provide the foregoing functions. In a simple embodiment, a person skilled in the art may figure out that the text search apparatus may be in the form shown in FIG. 5.

For example, the processor 501 in FIG. 5 may invoke computer-executable instructions stored in the memory 502, so that the text search apparatus performs the method performed by the text search apparatus in the method embodiment corresponding to FIG. 2.

Specifically, a function/an implementation process of the processing unit 602 in FIG. 6 may be implemented by the processor 501 in FIG. 5 by invoking computer-executable instructions stored in the memory 502. A function/an implementation process of the obtaining unit 601 in FIG. 6 may be implemented by the transceiver device 503 in FIG. 5.

Components in the device in FIG. 5 of this application are communicatively connected to each other. To be specific, the processing unit (or the processor), the storage unit (or the memory), and the transceiver device (the transceiver) communicate with each other through an internal connection path, to transfer a control signal and/or a data signal. The foregoing method embodiment of this application may be applied to a processor, or the steps in the foregoing method embodiment is implemented by a processor. The processor may be an integrated circuit chip and has a signal processing capability. In an implementation process, steps in the foregoing method embodiment can be implemented by using a hardware integrated logical circuit in the processor, or by using instructions in a form of software. The processor may be a central processing unit (CPU), a network processor (NP), a combination of the CPU and the NP, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in this application. The general-purpose processor may be a microprocessor, or the processor may be any conventional processor or the like. Steps in the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. Although only one processor is shown in the figure, the apparatus may include a plurality of processors, or the processor includes a plurality of processing units. Specifically, the processor may be a single-core processor (single-CPU), or may be a multi-core processor (multi-CPU).

The memory is configured to store computer instructions executed by the processor. The memory may be a storage circuit, or may be a memory. The memory may be a volatile memory or a nonvolatile memory, or may include the volatile memory and the nonvolatile memory. The nonvolatile memory may be a read-only memory, a programmable read-only memory, an erasable programmable read-only memory, an electrically erasable programmable read-only memory, or a flash memory. The volatile memory may be a random access memory, and may serve as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content interaction between the processor and another unit or network element. Specifically, the transceiver may be a communications interface of the apparatus, may be a transceiver circuit or a communications unit, or may be a transceiver. Alternatively, the transceiver may be a communications interface of the processor or a transceiver circuit. Optionally, the transceiver may be a transceiver chip. The transceiver may further include a sending unit and/or an obtaining unit. In a possible implementation, the transceiver may include at least one communications interface. In another possible implementation, the transceiver may alternatively be a unit implemented in a form of software. In embodiments of this application, the processor may interact with another unit or network element by using the transceiver. For example, the processor obtains or receives content from the another network element by using the transceiver. If the processor and the transceiver are two physically separated components, the processor may exchange content with the another unit of the apparatus without using the transceiver.

In a possible implementation, the processor, the memory, and the transceiver may be connected to each other through a bus. The bus may be a peripheral component interconnect (PCI) bus or an extended industry standard architecture (EISA) bus, or the like. Buses may be classified into an address bus, a data bus, a control bus, and the like.

In embodiments of this application, words such as "example" or "for example" are for representing giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

In embodiments of this application, for ease of understanding, a plurality of examples are used for description. However, these examples are merely examples, but do not mean optimal implementations for implementing this application.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

The technical solutions provided in this application are described in detail above. The principles and implementations of this application are described in this application by using specific examples. The description about the embodiments is merely provided to help understand the method and core ideas of this application. In addition, a person of ordinary skill in the art can make variations to the specific implementations and application scopes according to the idea of this application. Therefore, the content of this specification shall not be construed as a limitation to this application.

What is claimed is:

1. A text search method, comprising:
    obtaining a first text including one or more pieces of running path information, each of the one or more pieces of the running path information being a contiguous segment of log text that is generated during a running process of software code;

obtaining a search rule set, wherein the search rule set comprises one or more search rules, each of the one or more pieces of running path information corresponds to one or more search rules, and each of the one or more search rules indicates a logical relationship between at least one keyword;

searching for one or more second keywords based on a first keyword and a first search rule, wherein the first keyword is obtained based on first running path information, the first running path information is any one of the one or more pieces of running path information, and the first search rule is any search rule that is in the one or more search rules and corresponds to the first running path information; and obtaining a first search result based on the first keyword and the one or more second keywords.

2. The method according to claim 1, wherein the searching for the one or more second keywords based on the first keyword and the first search rule comprises:

obtaining a first row number for identifying a number of a row in which the first keyword is located; and searching an offset range for the one or more second keywords based on the first row number and the first search rule, wherein the offset range indicates a row offset value between the one or more second keywords and the first keyword.

3. The method according to claim 2, wherein the searching the offset range for the one or more second keywords based on the first row number and the first search rule comprises:

searching a first offset range for a third keyword based on the first row number and the first search rule, wherein the third keyword is any one of the one or more second keywords, and the first offset range corresponds to the third keyword.

4. The method according to claim 2, wherein the logical relationship comprises: a first identifier, a second identifier, and/or a third identifier, wherein the first identifier indicates that one or more keywords exist in the offset range, the second identifier indicates that one of the one or more keywords exists in the offset range, and the third identifier indicates that one or more keywords do not exist in the offset range.

5. The method according to claim 3, wherein the one or more second keywords further comprise a fourth keyword and a fifth keyword; and the method further comprises searching for the fourth keyword based on a second offset range, wherein the second offset range is obtained by using a row offset value between the fourth keyword and the first keyword, and the fourth keyword is one of the one or more second keywords; or the second offset range is obtained by using a row offset value between the fifth keyword and the fourth keyword and a row offset value between the fourth keyword and the first keyword, and the fifth keyword is a keyword that is in the one or more second keywords and that is different from the fourth keyword.

6. The method according to claim 2, wherein the obtaining of the first row number comprises:

obtaining a second text by processing the first text by using a hash algorithm; and obtaining the first row number based on the second text.

7. The method according to claim 1, wherein a keyword type comprises at least one of a string type or a key-value pair type.

8. A text search apparatus, comprising:

receiver, configured to obtain a first text, wherein the first text comprises one or more pieces of running path information, each of the one or more pieces of the running path information being a contiguous segment of log text that is generated during a running process of software code, and the receiver is configured to obtain a search rule set, wherein the search rule set comprises one or more search rules, and each search rule indicates a logical relationship between at least one keyword; and at least one processor, configured to search for one or more second keywords based on a first keyword and a first search rule, wherein the first keyword is obtained based on first running path information, the first running path information is any one of the one or more pieces of running path information, and the first search rule is any search rule that is in the one or more search rules and corresponds to the first running path information; and the at least one processor is configured to obtain a first search result based on the first keyword and the one or more second keywords.

9. The text search apparatus according to claim 8, wherein the receiver is configured to obtain a first row number for identifying a number of a row in which the first keyword is located; and the at least one processor is configured to search an offset range for the one or more second keywords based on the first row number and the first search rule, wherein the offset range indicates a row offset value between the one or more second keywords and the first keyword.

10. The text search apparatus according to claim 9, wherein the at least one processor is further configured to search a first offset range for a third keyword based on the first row number and the first search rule, wherein the third keyword is any one of the one or more second keywords, and the first offset range corresponds to the third keyword.

11. The text search apparatus according to claim 9, wherein the logical relationship comprises a first identifier, a second identifier, and/or a third identifier, wherein the first identifier indicates that one or more keywords exist in the offset range, the second identifier indicates that one of the one or more keywords exists in the offset range, and the third identifier indicates that one or more keywords do not exist in the offset range.

12. The text search apparatus according to claim 10, wherein the one or more second keywords further comprise a fourth keyword and a fifth keyword; and the at least one processor is configured to search for the fourth keyword based on a second offset range, wherein the second offset range is obtained by using a row offset value between the fourth keyword and the first keyword, and the fourth keyword is one of the one or more of the second keywords; or the second offset range is obtained by using a row offset value between the fifth keyword and the fourth keyword and a row offset value between the fourth keyword and the first keyword, and the fifth keyword is in the one or more second keywords and is different from the fourth keyword.

13. The text search apparatus according to claim 9, wherein the receiver is configured to:

obtain a second text by processing the first text by using a hash algorithm; and obtain the first row number based on the second text.

14. The text search apparatus according to claim 8, wherein a keyword type comprises at least one of a string type or a key-value pair type.

15. A non-transitory, computer-readable storage medium storing instructions that, when run on a computer, enable the computer to perform operations comprising:

obtaining a first text including one or more pieces of running path information, each of the one or more pieces of the running path information being a contiguous segment of log text that is generated during a running process of software code;

obtaining a search rule set, wherein the search rule set comprises one or more search rules, each of the one or more pieces of running path information corresponds to one or more search rules, and each of the one or more search rules indicates a logical relationship between at least one keyword;

searching for one or more second keywords based on a first keyword and a first search rule, wherein the first keyword is obtained based on first running path information, the first running path information is any one of the one or more pieces of running path information, and the first search rule is any search rule that is in the one or more search rules and corresponds to the first running path information; and obtaining a first search result based on the first keyword and the one or more second keywords.

16. The non-transitory, computer-readable storage medium according to claim 15, wherein the searching for the one or more second keywords based on the first keyword and the first search rule comprises:

obtaining a first row number for identifying a number of a row in which the first keyword is located; and searching an offset range for the one or more second keywords based on the first row number and the first search rule, wherein the offset range indicates a row offset value between the one or more second keywords and the first keyword.

17. The non-transitory, computer-readable storage medium according to claim 16, wherein the searching the offset range for the one or more second keywords based on the first row number and the first search rule comprises:

searching a first offset range for a third keyword based on the first row number and the first search rule, wherein the third keyword is any one of the one or more second keywords, and the first offset range corresponds to the third keyword.

18. The non-transitory, computer-readable storage medium according to claim 16, wherein the logical relationship comprises: a first identifier, a second identifier, and/or a third identifier, wherein the first identifier indicates that one or more keywords exist in the offset range, the second identifier indicates that one of the one or more keywords exists in the offset range, and the third identifier indicates that one or more keywords do not exist in the offset range.

\* \* \* \* \*